2,802,307
METHOD FOR INCREASING NUTRITIVE VALUE OF FOLIAGE

Irvin Joseph Belasco, Myers Floyd Gribbins, Delbert Wayne Kolterman, and Francis Boyd Vaughan, Wilmington, Del., assignors to E. I. du Pont de Nemours and Company, Wilmington, Del., a corporation of Delaware No Drawing. Application June 12, 1956,
Serial No. 590,827

5 Claims. (Cl. 47—58)

This invention relates to a novel method for production of foliage crops and increasing their nutritive value.

Heretofore, it has been well known that in many instances plant growth can be stimulated by the application of aqueous solutions of urea and other nitrogenous compounds to the leaves, whereby the production of various crops such as citrous fruits, apples, etc., could be enhanced. It has also been recognized that urea is an effective source of nitrogen when employed as a ground fertilizer.

The present invention is based upon a further discovery, namely that after absorption of urea (or other similar sources of nitrogen) by foliage, a significant change occurs in the nutritive value thereof, which is reflected in an increased digestion and utilization rate of nutrients including cellulose when the foliage is eaten by animals. The increased rates cannot be explained solely on the basis of the increased nitrogen content of the crops. For example, the increase in the rate of cellulose utilization by ruminants evidently is associated with conversion of the nitrogen source, e. g. urea, to products which have the observed beneficial influence on cellulose digestion or with physiological alteration of the cellulosic constituents.

Moreover, the conversion of the nitrogen source to the especially beneficial products proceeds at an unexpectedly rapid rate independent of previously known growth processes. Thus, it is apparent that the production of urea-conversion products which have the above-described activity necessarily starts simultaneously with the absorption of the nitrogen source and is especially evident after about 8 hours to 10 days after the application. This is accompanied by an increase in the content of protein, and an increase in the availability of the leaf materials to e. g. rumen bacteria. After about 10 days, this particular effect of the absorbed nitrogen is not so pronounced, hence harvesting of the crop should be accomplished before the tenth day after the application.

The nitrogen in the form of urea may be applied in concentrations of about 10 to 800 pounds of urea per 100 gallons of water. The quantity of urea does not have to be large—suitably about 10 to 20 pounds on a nitrogen basis per acre covered by the foliage crop. This is considerably lower than the amount of nitrogen fertilizer generally required for ground application to pastures, foliar absorption being much more efficient than ground application, which is always accompanied by leaching, dilution, and other losses.

The present invention thus comprises applying aqueous urea or other similar sources of nitrogen to the foliage of plants, especially those plants in the process of maturation, and harvesting the thus treated foliage shortly after the said application. Preferably the solution should be applied in the form of a mist.

One of the remarkable advantages of the present invention is the improvement of certain plant species which would otherwise not be highly efficient as ruminant feed. For instance, as illustrated in the examples which follow, prickly pear cactus is one of the plants which is greatly improved for utilization by ruminant animals, by the method of this invention.

The timing of the foliar application depends upon the expected time of harvest. In contrast with conventional fertilizer applications, this application should occur at or near the end of the plant growth cycle rather than as a stimulus therefor. Actually, during the latter part of summer, pasture crops become more mature, lower in protein content, and lower in nutritional value. The application may be timed to supply the necessary improvement in nutritional value, in such crops, shortly before harvesting (either mechanical harvesting or grazing). It is ineffective, or relatively ineffective, if applied when the plant is dormant due to senescence, frost, or other causes.

The invention is illustrated further by means of the following examples.

EXAMPLE 1

During the month of October, the pads of prickly pear cactus plants were dipped in urea solutions containing 50 pounds of urea per 200 gallons of water. Pads of reasonably uniform size and character were used for the tests. Similar tests were made using a concentration of 200 pounds of urea per 200 gallons of water. Control samples were also provided for comparison. In each instance, the dip lasted from 3 to 5 seconds. As shown in the following Table I, some of the test samples were washed after 8 hours, and others after 24 hours. The analytical data presented in Table I were obtained on the test specimens. The data showed that most of the nitrogen was absorbed within 8 hours. All of the treated samples had a higher nitrogen content than any of the controls. In laboratory rumen evaluations a control sample with the lowest nitrogen content of 1.0% was included, as were two treated samples which had an intermediate nitrogen content of 1.7%, and another having a high nitrogen content of 2.3%. The average nitrogen content of the treated sample was thus 42% greater than that of the controls, while the best of the treated samples had a nirogen content 83% greater than the controls. All samples were run in quadruplicate. These samples were subjected to rumen digestion tests, which showed a dramatic improvement in cellulose digestion. The treated samples, in the rumen tests, showed 60% better cellulose digestion than did the control, as recorded in Table II. The addition of urea to equalize the nitrogen content of the control with the sample having the highest nitrogen content increased cellulose digestion only 3%. This signified that the urea when applied to the cactus was absorbed and converted to a metabolite stimulatory to the plant in a way which made the nutrients more available to rumen microorganisms and thus to the host ruminant.

To illustrate further that pear cactus, treated as in this example, is beneficial to animals, a herd of cattle was given access to pear cactus (singed free of spines), treated as above-described, and a control feed non-sprayed pear cactus. The tests showed that the sprayed cactus was at least as palatable as the unsprayed cactus, the average quantity eaten per cow per day being about 40 to 68 pounds. The cattle flourished when fed in this manner, and actually showed a preference for the treated cactus, after the first few days.

TABLE I

*The nitrogen content of prickly pear cactus following urea application*

| Sample | Urea soln. (lbs./100 gal. water) | H₂O Wash | Total Nitrogen (Percent, Dry Basis) | Percent Increase Over Control |
|---|---|---|---|---|
| 1 | 0 | None | 1.3 ⎫ Av. | |
| 2 | 0 | do | 1.0 ⎬ 1.2 | |
| 3 | 0 | do | 1.2 ⎭ | |
| 4 | 50 | do | 1.4 | |
| 5 | 50 | do | 1.7 | |
| 6 | 200 | do | 2.1 | |
| 7 | 200 | do | 1.3 ⎫ Av. | 42 |
| 8 | 200 | After 8 Hrs | 2.2 ⎬ 1.7 | |
| 9 | 200 | After 8 Hrs | 1.6 ⎭ | |
| 10 | 200 | After 24 Hrs | 1.6 | |
| 11 | 200 | After 24 Hrs | 1.5 | |

TABLE II

*Rumen response to urea-treated cacti*

| Sample | Percent Total Nitrogen (Dry Basis) | Urea Application (lbs./100 gal. water) | Percent Cellulose Digestion | Percent Increase Over Control |
|---|---|---|---|---|
| 2 | 1.0 | 0 | 37.5 | |
| 5 | 1.7 | 50 | 58.9 | 57 |
| 8 | 2.2 | 200 | 61.9 | 62 |
| 2+Urea | 2.2 | 0 | 38.4 | 3 |

Pangola grass pastures in Florida were sprayed with aqueous urea at rates of 0, 10, 20, and 40 pounds of urea per acre. Samples were taken in each area 3 days after treatment. Table III shows the nitrogen analyses of the samples. The amount of residual urea present was too small to account for the increased nitrogen of the grass. This indicates absorption and conversion of the urea. Table IV shows the response of rumen to the treated Pangola grass. The increases in cellulose digestion cannot be explained solely on the basis of the increased nitrogen content of the Pangola grass. A series of tests was performed to determine the effect of adding urea to the treated foliage. At rates of 10, 20, and 40 pounds of urea per acre, as shown in Table V, the results showed increases in cellulose digestion of 58%, 78% and 82%, respectively, which qualitatively confirmed the results reported in Table IV, and indeed appeared somewhat better, considering the fact that the control in this instance had a relatively low digestion rate. When a small amount of urea, namely 40 milligrams per 10 grams, was added to each of the samples as a supplement to the urea-conversion product formed in the original treatment, the percent increase in cellulose digestion was also greatly improved over that of the control sample, and also further improved over that of the grass which had been treated only in vivo. The results are reported in Table V.

TABLE III

*The nitrogen content of Pangola grass following urea application*

| Sample | Urea Application (lbs./acre) | Total Nitrogen (Percent, Dry Basis) | Percent Increase over Control |
|---|---|---|---|
| 1 | 0 | 1.25 | |
| 2 | 10 | 1.50 | 20 |
| 3 | 20 | 1.50 | 20 |
| 4 | 40 | 1.45 | 16 |

TABLE IV

*Rumen response to Pangola grass treated with urea*

| Sample | Urea Application Rate (lbs./acre) | Total Nitrogen (Percent, Dry Basis) | Cellulose Digestion (Percent) | Percent Increase over Control |
|---|---|---|---|---|
| 1 | None | 1.25 | 27.6 | |
| 2 | 10 | 1.50 | 37.0 | 34 |
| 3 | 20 | 1.50 | 40.1 | 49 |
| 4 | 40 | 1.45 | 42.0 | 52 |

TABLE V

*Rumen response to urea treated Pangola grass with supplemental urea*

| Sample | Urea Application (lbs./acre) | Urea Added (mg./10 g. sample) | Cellulose Digestion (Percent) | Percent Increase over Control |
|---|---|---|---|---|
| 1 | 0 | 0 | 23.1 | |
| 2 | 10 | 0 | 36.5 | 58 |
| 3 | 20 | 0 | 41.0 | 78 |
| 4 | 40 | 0 | 42.0 | 82 |
| 1 | 0 | 40 | 44.9 | 94 |
| 2 | 10 | 40 | 54.0 | 134 |
| 3 | 20 | 40 | 54.3 | 136 |
| 4 | 40 | 40 | 55.7 | 141 |

In the experiments hereinabove described the rates of cellulose digestion by rumen bacteria were measured according to the procedure described in the Gribbins Patent U. S. 2,687,354, which issued on August 24, 1954. In these tests the following flask ingredients were used: sample, 10 grams; molasses ash, 0.6 gram; aqueous nutrient salt solution, 60 ml. (containing the following per liter: sodium phosphate, monobasic, 52.5 grams; sodium bicarbonate, 52.5 grams; ammonium sulfate, 37.5 grams; potassium chloride, 7.5 grams; sodium chloride, 7.5 grams; magnesium sulfate, 2.25 grams; calcium chloride, 0.75 gram; ferrous sulfate, 0.15 gram); dextrose, 1 gram; starch, 1 gram; rumen inoculum, 450 ml.; and water, to a total volume of 900 ml.

The present invention is especially valuable in increasing food supply for animals and, either directly or indirectly, for human beings. The invention is, of course, not limited to the use of the specific plants cited herein as illustrations, but has very wide applicability to various types of plants. Fields of corn, or oats, can be treated in the manner herein described to improve the quality of the corn and oats, and also to improve the utility of the corn husks and stalks and oat straw.

While the invention has been illustrated herein with special reference to urea, it is to be noted that other nitrogen sources such as ammonium salts, amides, and amino acids can, in varying degrees, serve as satisfactory substitutes for the urea. Actually, urea is, by far, the most satisfactory and most economical agent to employ in the practice of the invention.

The term "foliage" as employed herein means the mass of leafage, cactus pads, or other functionally similar green growth in living plants, as produced in nature.

We claim:
1. The method which comprises treating the foliage of plants directly with a source of nitrogen prior to harvesting, harvesting said foliage at from 8 hours to 10 days after said treatment, whereby the said foliage is made of greater nutritive value to animals.

2. The method which comprises treating the foliage of mature plants directly with a mist composed of aqueous urea, harvesting said foliage at from 8 hours to 10 days after said treatment, whereby the digestibility of the cellulose component of said foliage in the presence of rumen bacteria is enhanced.

3. The method which comprises applying a mist composed of aqueous urea to cactus, in vivo, and utilizing said cactus as feed for ruminants at a time not less than 8 hours after said application, nor longer thereafter than the time during which the cellulose in said cactus is more rapidly digestible than that of similar cactus which has not been thus treated.

4. The method which comprises applying a mist composed of aqueous urea to foliage in vivo, and utilizing said foliage as feed for ruminants at a time not less than 8 hours after said application, nor longer thereafter than the time during which the cellulose in said foliage is more rapidly digestible than that of similar foliage which is not thus treated.

5. The method which comprises applying a mist composed of aqueous urea to grass in vivo, and utilizing said grass as feed for ruminants at a time not less than 8 hours after said application, nor longer thereafter than the time during which the cellulose in said grass is more rapidly digestible than that of similar grass which is not thus treated.

References Cited in the file of this patent

UNITED STATES PATENTS 2,663,629    Semon _____ Dec. 22, 1953